US009509381B1

United States Patent
Kwon et al.

(10) Patent No.: US 9,509,381 B1
(45) Date of Patent: Nov. 29, 2016

(54) APPARATUS AND METHOD OF BLIND DETECTION OF INTERFERENCE RANK INFORMATION IN WIRELESS COMMUNICATION SYSTEM

(71) Applicant: Samsung Electronics Co., Ltd., Gyeonggi-do (KR)

(72) Inventors: Hyukjoon Kwon, San Diego, CA (US); Mojtaba Rahmati, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/957,309

(22) Filed: Dec. 2, 2015

Related U.S. Application Data

(60) Provisional application No. 62/220,469, filed on Sep. 18, 2015.

(51) Int. Cl.
*H04B 7/02* (2006.01)
*H04B 7/04* (2006.01)
*H04L 5/00* (2006.01)
*H04W 76/04* (2009.01)
*H04W 72/04* (2009.01)

(52) U.S. Cl.
CPC .......... *H04B 7/0456* (2013.01); *H04L 5/0048* (2013.01); *H04W 72/042* (2013.01); *H04W 76/046* (2013.01)

(58) Field of Classification Search
CPC .......... H04W 28/048; H04W 52/244; H04W 72/0453; H04W 72/04; H04B 7/024; H04B 7/063; H04B 7/0413; H04B 1/71055; H04B 1/0475; H04B 1/715; H04B 2001/7152; H04B 7/15585; H04B 2001/7154; H04B 1/1027; H04B 7/0452; H04B 1/10; H04B 7/068; H04B 7/0854; H04L 27/2691; H04L 47/78; H04L 25/0248; H04L 27/2647; H04L 5/0023; H04L 5/0035; H04L 5/023; H04L 1/0606; H04L 25/0328; H04L 1/0036
USPC ...... 375/346, 347, 350, 267, 349; 455/114.2
See application file for complete search history.

(56) References Cited

U.S. PATENT DOCUMENTS

| | | | |
|---|---|---|---|
| 6,658,748 B1 | 12/2003 | Leipold et al. |
| 7,212,073 B2 | 5/2007 | Youssoufian et al. |
| 7,474,167 B1 | 1/2009 | Zhuang et al. |
| 8,198,944 B2 | 6/2012 | Sun et al. |
| 8,222,962 B2 | 7/2012 | Lin et al. |
| 2009/0302958 A1 | 12/2009 | Sakurai et al. |
| 2010/0052795 A1 | 3/2010 | Nakamura et al. |
| 2010/0134195 A1 | 6/2010 | Lee et al. |

(Continued)

FOREIGN PATENT DOCUMENTS

| | | |
|---|---|---|
| WO | WO 2014-006439 | 1/2014 |
| WO | WO 2014-194948 | 12/2014 |

*Primary Examiner* — Rahel Guarino
(74) *Attorney, Agent, or Firm* — The Farrell Law Firm, P.C.

(57) ABSTRACT

A method is provided. The method includes receiving a signal, wherein the signal includes a serving signal and an interference signal; removing the serving signal from the received signal to provide a residual signal; equalizing the residual signal based on linear estimation; determining a sample sum of the equalized signal; determining a plurality of eigenvalues from the sample sum; and estimating a transmission rank of the interference signal using hypothesis testing based on the plurality of eigenvalues.

20 Claims, 10 Drawing Sheets

(56) References Cited

U.S. PATENT DOCUMENTS

| | | |
|---|---|---|
| 2013/0148538 A1 | 6/2013 | Ohwatari et al. |
| 2014/0098773 A1 | 4/2014 | Yoo et al. |
| 2014/0167871 A1 | 6/2014 | Ahmed et al. |
| 2014/0184363 A1 | 7/2014 | Jou et al. |
| 2014/0233466 A1 | 8/2014 | Pourahmadi et al. |
| 2014/0347137 A1 | 11/2014 | Rey et al. |
| 2015/0078191 A1 | 3/2015 | Jongren et al. |
| 2016/0036547 A1* | 2/2016 | Lee ................ H04B 7/0486 370/329 |

\* cited by examiner

APPARATUS AND METHOD OF BLIND DETECTION OF INTERFERENCE RANK INFORMATION IN WIRELESS COMMUNICATION SYSTEM

PRIORITY

This application claims priority under 35 U.S.C. §119(e) to a U.S. Provisional Patent Application filed on Sep. 18, 2015 in the United States Patent and Trademark Office and assigned Ser. No. 62/220,469, the entire contents of which are incorporated herein by reference.

BACKGROUND OF THE DISCLOSURE

1. Field of the Disclosure

The present disclosure relates generally to blind detection of interference parameters, and more particularly, to blind detection of interference rank information in a wireless communication system.

2. Description of the Related Art

A interference channel of a communication system may include inter-cell interference and multi-user interference. Typically, an advanced receiver may exploit interference parameters for its detection. The rank information of interference is one of the parameters that a user equipment (UE) must blindly estimate for its advanced operation. If the rank information is available, other parameters such as precoding indices and modulation orders may be estimated, sequentially.

For a serving signal, the rank information is included in its downlink control information (DCI) format, which is conveyed on a physical downlink control channel (PDCCH) region, being encrypted with a unique user identity. Since the user identity is carried via radio resource control (RRC) signaling, each user may blindly decode its own PDCCH at the right position. However, for interference, it is difficult to identify the right position of PDCCH. Thus, many heuristic trials are required to decode interference PDCCH. Accordingly, receiver complexity increases.

Alternatively, blind detection algorithms for interference parameters have been proposed such as joint detection, distance-based, and correlation-based. However, such algorithms are complex and costly to implement.

SUMMARY

A method is provided. The method includes receiving a signal, wherein the signal includes a serving signal and an interference signal; removing the serving signal from the received signal to provide a residual signal; equalizing the residual signal based on linear estimation; determining a sample sum of the equalized signal; determining a plurality of eigenvalues from the sample sum; and estimating a transmission rank of the interference signal using hypothesis testing based on the plurality of eigenvalues.

In accordance with another aspect of the present disclosure, an apparatus is provided. The apparatus includes a receiver configured to receive a signal, wherein the signal includes a serving signal and an interference signal; a signal cancellation function block configured to remove the serving signal from the received signal to provide a residual signal; an equalizer configured to equalize the residual signal based on linear estimation; a summation function block configured to determine a sample sum of the equalized signal; an eigenvalue generator configured to determine a plurality of eigenvalues from the sample sum; and transmission rank estimation function block configured to estimate a transmission rank of the interference signal using hypothesis testing based on the plurality of eigenvalues.

In accordance with another aspect of the present disclosure, a chipset is provided. The chipset is configured to receive, by a receiver, a signal; cancel, by a serving signal cancellation function block, a serving signal from the received signal; equalize, by an equalizer, an interference channel; re-calculate, by a re-calculation function block, a noise distribution and a signal gain; calculate, by a summation function block, a sample sum of the result of re-calculating the noise distribution and the signal gain; generate, by an eigenvalue generator, an eigenvalue for each possible rank; generate, by a probability density function generator, a probability density function for each possible rank; and compare, by a comparator, probabilities from the probability density functions to blindly detect interference rank information.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
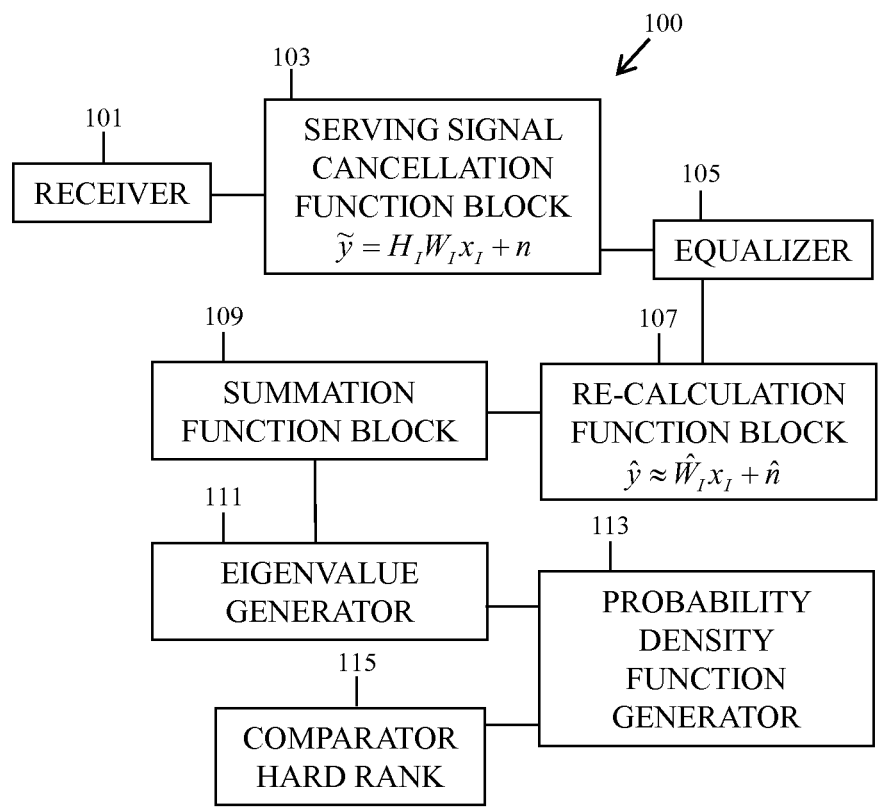
FIG. 1 is a block diagram of an apparatus for blind detection of interference rank information using a hard rank according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

The present disclosure concerns an apparatus for and method of blind detection of interference rank information that has low complexity and low cost of implementation. While the present disclosure is described with regard to a wireless communication system (e.g., LTE), the present disclosure is not limited thereto, and is identically applicable to other suitable systems.

FIG. 1 is an apparatus 100 for blind detection of interference rank information according to an embodiment of the present disclosure.

Referring to FIG. 1, the apparatus 100 includes a receiver 101, a serving signal cancellation function block 103, an equalizer 105, a re-calculation function block 107, a summation function block 109, an eigenvalue generator 111, a probability density function generator 113, and a comparator 115.

The receiver 101 receives a signal (e.g., an LTE signal), where the received signal may be expressed as in Equation (1) as follows:

$$y = H_s W_s x_s + H_I W_I x_I + n \quad (1)$$

where the subscripts S and I imply a serving signal $x_s$ and a dominant interference signal $x_I$, respectively. However, the present disclosure is not limited to a case where only a single interference signal is present, but also applies to multiple interference signals, where a non-dominant interference signal may be treated as additional noise combined with background noise. In addition, $H_k$ is a channel matrix, $W_k$ is a precoding matrix, where k=S or I, and n is a noise vector.

In an embodiment of the present disclosure, Equation (1) is used to estimate an interference rank, i.e., a number of columns in $W_I$. The dimensions of the channel matrix $H_k$ are equal to the number of receive antennas by the number of transmit antennas, and the dimensions of the precoding matrix $W_k$ are equal to the number of transmit antennas by its rank. A node of a communication network, for example, an evolved Node B (eNodeB) of a LTE radio access network, may choose from specified transmission modes (TMs). Presently, there are ten TMs from which to choose. For each present TM, the feasible number of a rank is either 1 or 2. However, the present disclosure is not limited to a rank of either 1 or 2, but applies to any rank. A method of choosing a rank of interference (e.g., rank 1 or rank 2) from the feasible ranks of interference is described below.

The serving signal cancellation function block 103 is connected to the receiver 101. The serving signal cancellation function block 103 cancels the serving signal $x_s$ from the signal received by the receiver 101. In an embodiment of the present disclosure, the serving signal $x_s$ is cancelled by converting Equation (1) above to Equation (2) as follows:

$$\tilde{y} = H_I W_I x_I + n \quad (2)$$

where $\tilde{y}$ is the result of cancelling the serving signal $x_s$ from the received signal.

The equalizer 105 is connected to the serving signal cancellation function block 103 for equalizing an interference channel. In an embodiment of the present disclosure, linear detection (e.g., minimum mean-square error (MMSE)) may be used to convert the received signal in Equation (2) above to be invariant of the instantaneous channel matrix $H_I$.

The re-calculation function block 107 is connected to the equalizer 105 to re-calculate a noise distribution and signal gain as in Equation (3) as follows:

$$\hat{y} \sim \hat{W}_I x_I + \hat{n} \quad (3)$$

where a linear detection matrix is applied. Note that both the precoding matrix $W_k$ and the noise vector n are changed to $\hat{W}$ and $\hat{n}$, respectively, to compensate for the effect of linear detection. That is, linear detection does not completely remove a channel matrix. Thus, $\hat{W}_I$ and $\hat{n}$ are not identical to $W_I$ and n, respectively. Hence, Equation (3) is approximately obtained such that both the precoding matrix $W_I$ and the noise vector n are re-adjusted to $\hat{W}_I$ and $\hat{n}$, respectively. This step is significant in determining estimation accuracy.

Equation (3) above corresponds to a single resource element (RE) in which a source of interference is not changed. The number of REs having the same interference source depends on the LTE specification.

The summation function block 109 is connected to the re-calculation function block 107 to sum, among all REs having the same $W_I$, a product of $\hat{y}$ and a transpose of the complex conjugate of $\hat{y}$ (i.e., $\hat{y}^\dagger$) to produce $\Sigma \hat{y} \hat{y}^\dagger$.

The eigenvalue generator 111 is connected to the summation function block 109 to generate a number of eigenvalues equal to the number of possible ranks (e.g., two eigenvalues for rank 1 and rank 2). In an embodiment of the present disclosure, where the interference rank is either 1 or 2, there are only two hypotheses about the rank (i.e., it is either rank 1 or rank 2).

A probability density function generator 113 is connected to the eigenvalue generator 111 to generate a probability density function for each possible rank. For example, if there are two possible ranks 1 and 2, hypothesizing that the rank is 1, the probability density function (PDF) corresponding to rank 1 is generated using the determined eigenvalues. Then, hypothesizing that the rank is 2, the PDF corresponding to rank 2 is generated using the determined eigenvalues.

The comparator 115 is connected to the probability density function generator 113 to compare the probabilities of the PDFs generated by the probability density function generator 113, and the rank of the more reliable hypothesis (e.g., the hypothesis with the highest probability) is determined as the rank of the interference. This is referred to as a hard rank. In an embodiment of the present disclosure described below, a soft rank is described. While the description above concerns rank 1 and rank 2, the present disclosure is not limited thereto. Thus, for a number of ranks greater than 2, the method above applies so that the rank associated with the most reliable hypothesis is determined to be the rank of the associated interference.

An embodiment of the present disclosure provides blind detection of interference rank information obtained using a sample-sum-based method (e.g., based on $\Sigma \hat{y}\hat{y}^\dagger$) and a statistical method using eigenvalues. No joint detection with any signals and any parameters is used. Linear detection such as MMSE is applied, and its approximation is post-compensated for by adjusting both signal gain and noise covariance. Soft rank as well as hard rank may be applied to an embodiment of the present invention that has low complexity and low cost of implementation.

Figure 2:
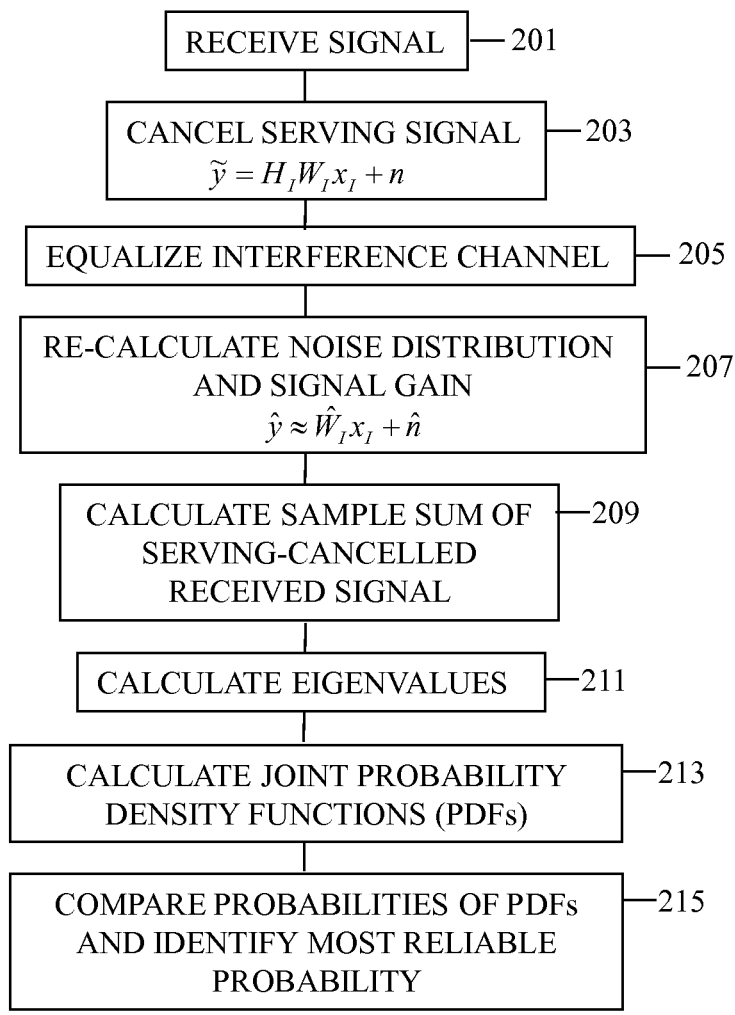
FIG. 2 is a flowchart of a method of blind detection of interference rank information using a hard rank according to an embodiment of the present disclosure.

FIG. 2 is a flowchart of a method of blind detection of interference rank information according to an embodiment of the present disclosure.

Referring to FIG. 2, a signal (e.g., an LTE signal) is received at 201, where the received signal may be expressed as in Equation (1) above.

At 203, the serving signal $x_s$ is cancelled from the received signal by a serving signal cancellation function block. In an embodiment of the present disclosure, the serving signal $x_s$ is cancelled by converting Equation (1) above to Equation (2) above, where $\hat{y}$ is the result of cancelling the serving signal $x_s$ from the received signal.

At 205, an interference channel is equalized by an equalizer. In an embodiment of the present disclosure, linear detection (e.g., MMSE) may be used to convert the received signal in Equation (2) above to be invariant of the instantaneous channel matrix $H_1$.

At 207, noise distribution and signal gain is recalculated by a re-calculation function block as in Equation (3) above, where a linear detection matrix is applied.

At 209, among all REs having the same $W_f$, a sum of the product of $\hat{y}$ and a transpose of the complex conjugate of $\hat{y}$ (i.e., $\hat{y}^\dagger$) is calculated by a summation function block to produce $\Sigma \hat{y}\hat{y}^\dagger$.

At 211, eigenvalues equal to the number of possible ranks are determined (e.g., two eigenvalues for rank 1 and rank 2) by an eigenvalue generator. In an embodiment of the present disclosure, where the interference rank is either 1 or 2, there are only two hypotheses about the rank (i.e., the rank is either 1 or 2).

At 213, a PDF for each possible rank is calculated by a probability density function generator.

At 215, probabilities from the PDFs for all the possible ranks are compared by a comparator, and the rank of the more reliable hypothesis (e.g., the hypothesis with the highest probability) is determined as the rank of the interference.

Figure 3:
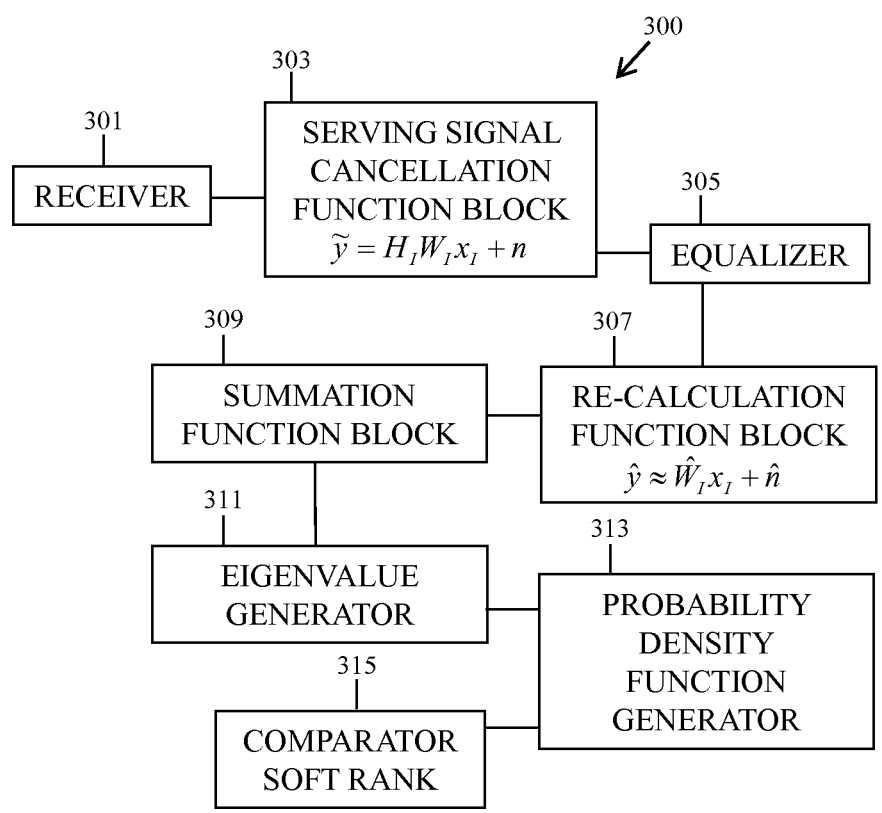
FIG. 3 is a block diagram of an apparatus for blind detection of interference rank information using a soft rank according to an embodiment of the present disclosure.

FIG. 3 is an apparatus 300 for blind detection of interference rank information according to an embodiment of the present disclosure.

Referring to FIG. 3, the apparatus 300 includes a receiver 301, a serving signal cancellation function block 303, an equalizer 305, a re-calculation function block 307, a summation function block 309, an eigenvalue generator 311, a probability density function generator 313, and a comparator 315.

The receiver 301 receives a signal (e.g., an LTE signal), where the received signal may be expressed as in Equation (1) above.

The serving signal cancellation function block 303 is connected to the receiver 301. The serving signal cancellation function block 303 cancels the serving signal $x_s$ from the signal received by the receiver 301. In an embodiment of the present disclosure, the serving signal $x_s$ is cancelled by converting Equation (1) above to Equation (2) above, where $\hat{y}$ is the result of cancelling the serving signal $x_s$ from the received signal.

The equalizer 305 is connected to the serving signal cancellation function block 103 for equalizing an interference channel. In an embodiment of the present disclosure, linear detection (e.g., MMSE) may be used to convert the received signal in Equation (2) above to be invariant of the instantaneous channel matrix $H_1$.

The re-calculation function block 307 is connected to the equalizer 305 to re-calculate a noise distribution and signal gain as in Equation (3) above, where a linear detection matrix is applied.

The summation function block 309 is connected to the re-calculation function block 307 to sum, among all REs having the same $W_f$, a product of $\hat{y}$ and a transpose of the complex conjugate of $\hat{y}$ (i.e., $\hat{y}^\dagger$) to produce $\Sigma \hat{y}\hat{y}^\dagger$.

The eigenvalue generator 311 is connected to the summation function block 309 to generate a number of eigenvalues equal to the number of possible ranks (e.g., two eigenvalues for rank 1 and 2). In an embodiment of the present disclosure, where the interference rank is either 1 or 2, there are only two hypotheses about the rank (i.e., it is either rank 1 or rank 2).

A probability density function generator 313 is connected to the eigenvalue generator 311 to generate a probability density function for each possible rank. For example, if there are two possible ranks 1 and 2, hypothesizing that the rank is 1, the PDF corresponding to rank 1 is generated using the determined eigenvalues. Then, hypothesizing that the rank is 2, the PDF corresponding to rank 2 is generated using the determined eigenvalues.

The comparator 315 is connected to the probability density function generator 313 to determine ratios and relative probabilities between the probabilities of the PDFs generated by the probability density function generator 313. This is referred to as a soft rank. The probabilities of all of the ranks are retained for subsequent blind detection operations. In an embodiment of the present disclosure, a soft rank may be applied (e.g., a probability is determined for each possible rank). For example, if the probability of rank 1 is 70% and the probability of rank 2 is 30%, both ranks are considered with 70% and 30% probabilities, respectively. While the description above concerns rank 1 and rank 2, the present disclosure is not limited thereto. Thus, for a number of ranks greater than 2, the method above applies so that the rank associated with the most reliable hypothesis is determined to be the rank of the associated interference.

Figure 4:
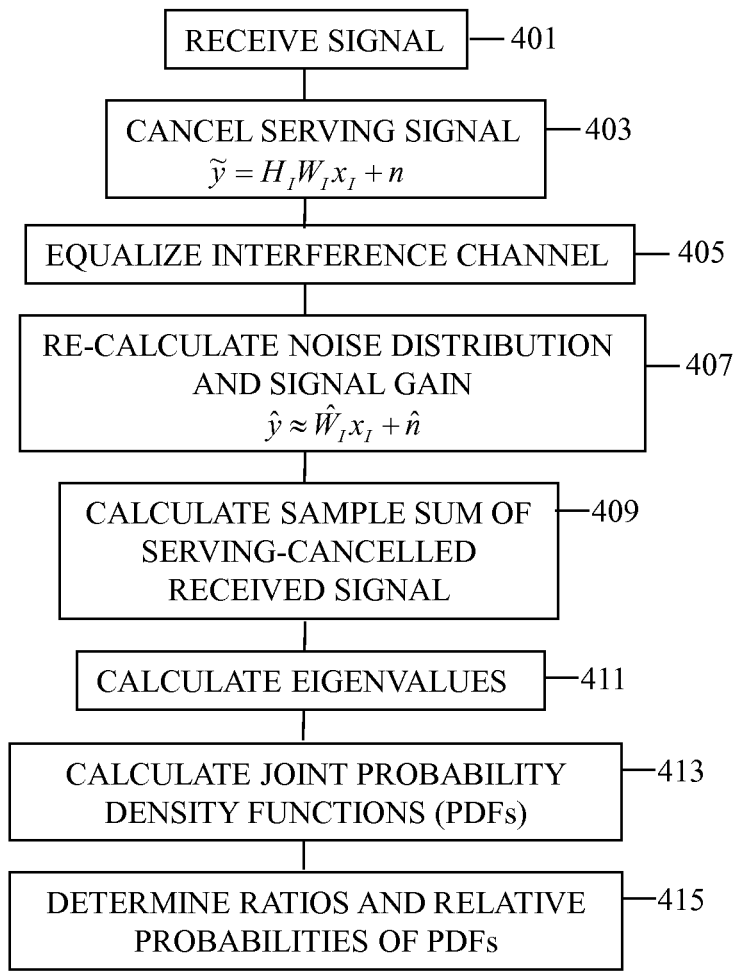
FIG. 4 is a flowchart of a method of blind detection of interference rank information using a soft rank according to an embodiment of the present disclosure.

FIG. 4 is a flowchart of a method of blind detection of interference rank information according to an embodiment of the present disclosure.

Referring to FIG. 4, a signal (e.g., an LTE signal) is received at 401, where the received signal may be expressed as in Equation (1) above.

At 403, the serving signal $x_s$ is cancelled by a serving signal cancellation function block. In an embodiment of the present disclosure, the serving signal $x_s$ is cancelled by converting Equation (1) above to Equation (2) above, where $\tilde{y}$ is the received signal in which the serving signal $x_s$ is cancelled.

At 405, an interference channel is equalized by an equalizer. In an embodiment of the present disclosure, linear detection (e.g., MMSE) may be used to convert the received signal in Equation (2) above to be invariant of the instantaneous channel matrix $H_I$.

At 407, noise distribution and signal gain is recalculated by a re-calculation function block as in Equation (3) above, where a linear detection matrix is applied.

At 409, among all REs having the same $W_I$, a sum of the product of $\hat{y}$ and a transpose of the complex conjugate of $\hat{y}$ (i.e., $\hat{y}^\dagger$) is calculated by a summation function block to produce $\Sigma \hat{y} \hat{y}^\dagger$.

At 411, eigenvalues equal to the number of possible ranks are determined (e.g., two eigenvalues for rank 1 and 2) by an eigenvalue generator. In an embodiment of the present disclosure, where the interference rank is either 1 or 2, there are only two hypotheses about the rank (i.e., rank 1 or 2).

At 413, a probability density function for each possible rank is calculated by a probability density function generator. For example, if there are two possible ranks 1 and 2, hypothesizing that the rank is 1, its corresponding probability density function (PDF) is calculated using the determined eigenvalues. Then, hypothesizing that the rank is 2, its corresponding PDF is calculated using the determined eigenvalues.

At 415, ratios and relative probabilities of the PDFs are determined by a ratio and relative probability function block.

Figure 5:
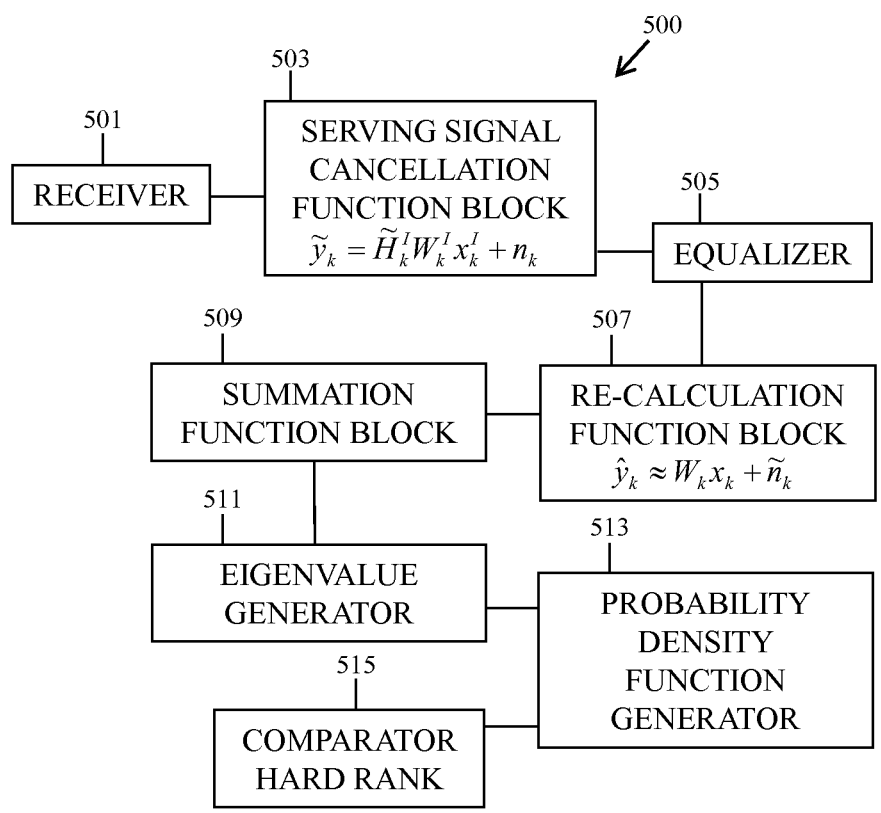
FIG. 5 is a block diagram of an apparatus for blind detection of interference rank information using a hard rank according to an embodiment of the present disclosure.

FIG. 5 is an apparatus 500 for blind detection of interference rank information according to an embodiment of the present disclosure.

Referring to FIG. 5, the apparatus 500 includes a receiver 501, a serving signal cancellation function block 503, an equalizer 505, a re-calculation function block 507, a summation function block 509, an eigenvalue generator 511, a probability density function generator 513, and a comparator 515.

The receiver 501 receives a signal (e.g., an LTE signal).

The serving signal cancellation function block 503 is connected to the receiver 501 for cancelling a serving signal $x_k^s$ from the signal received by the receiver 501, where the received signal may be expressed by Equation (4) below, where Equation (4) is a modification of Equation (1) above, and where the subscript k indicates an index of REs having the same source of interference. Moreover, a power allocation matrix $P_k$ is added for both serving and interfering signals, which is effectively combined into a channel matrix $\tilde{H}_k$. Equation (4) is as follows:

$$\tilde{y}_k = y_k - H_k^s P_k^s W_k^s x_k^s = H_k^I P_k^I W_k^I x_k^I + n_k = \tilde{H}_k^I W_k^I x_k^I + n_k \quad (4)$$

It is assumed that the transmission mode (TM) is a cell-specific reference signal (CRS) related mode such as transmission mode 4 (e.g., TM4). However, the present disclosure is not limited to CRS, but could be applied to other TMs. In order to successfully cancel a serving signal, a UE should be aware of its own channel, power, precoding matrices, and its transmission data at the kth RE. The first three matrices $H_k^s$, $P_k^s$, and $W_k^s$, can be measured. Regarding the serving data $x_k^s$, two or more scenarios may be considered. That is, treating interference as noise and attempting to decode a serving signal. If a CRC is passed, no more processing is required. Otherwise, the decoding result is re-used to generate a soft mean of $x_k^s$, or its hard symbol from a slicer function block. If the number of CRS samples is sufficient, $x_k^s$ may be a CRS symbol itself, indicating that it is known by the UE.

The receive signal of Equation (4) may then be represented by only the interference and its channel matrix $\tilde{H}_k^I$. Thus, the superscript, I, is omitted below. From a current 3GPP LTE specification, an embodiment of the present disclosure considers a set of precoding matrices for the possible ranks (e.g., rank 1 or rank 2) in Equation (5) as follows:

$$W_k = \begin{cases} \frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix} & \text{if rank 1} \\ \frac{1}{\sqrt{2}}\begin{bmatrix}1&1\\1&-1\end{bmatrix}, \frac{1}{\sqrt{2}}\begin{bmatrix}1&1\\j&-j\end{bmatrix} & \text{if rank 2} \end{cases} \quad (5)$$

The equalizer 505 is connected to the serving signal cancellation function block 503 for equalizing the interference signal. In an embodiment of the present disclosure, the effect of a channel matrix, $H_k$, can be equalized with linear detection. For example, a linear detection method may be, but is not limited to, MMSE, Zero-forcing (ZF) detector, ZF detector with decision-feedback, MMSE detector, and so on. Any detection method that changes a form of "y=Hx+n" to the form of "y=Ax+v" where A is close to an identity matrix may be used in the present disclosure. Equation (6) below uses MMSE as an example. However, the present disclosure is not limited to using MMSE for linear detection.

$$W_{mmse,k} = (\tilde{H}_k \tilde{H}_k^\dagger + \sigma^2 I_{N_t})^{-1} \tilde{H}_k = \tilde{H}_k (\tilde{H}_k^\dagger \tilde{H}_k + \sigma^2 I_{N_t})^{-1} \quad (6)$$

The re-calculation function block 507 is connected to the equalizer 505 for re-calculating (e.g., approximating) the noise distribution and signal gain of the received signal as in Equation (7) as follows:

$$\hat{y}_k = W_{mmse,k}^\dagger \tilde{y}_k = W_{mmse,k}^\dagger \tilde{H}_k W_k x_k + W_{mmse,k}^\dagger n_k \approx W_k x_k + \tilde{n}_k \quad (7)$$

The noise vector is changed from white noise to MMSE-filtered noise.

If a channel matrix follows Rayleigh fading distribution, the statistical characteristics of MMSE-filtered noise could be analytically derived. The detail development is given below in Equations (8) to (13).

$$E[\tilde{n}_k \tilde{n}_k^\dagger] = E[W_{mmse,k}^\dagger n_k n_k^\dagger W_{mmse,k}] = E_W[E_n \\ [W_{mmse,k}^\dagger n_k n_k^\dagger W_{mmse,k}]|W_{mmse,k}] = \\ E_W[W_{mmse,k}^\dagger E_n[n_k n_k^\dagger] W_{mmse,k}|W_{mmse,k}] = \sigma^2 E_W \\ [W_{mmse,k}^\dagger W_{mmse,k}] = \sigma^2 E_W[(\tilde{H}_k^\dagger \tilde{H}_k + \sigma^2 I_{N_t})^{-1} \tilde{H}_k^\dagger \tilde{H}_k \\ (\tilde{H}_k^\dagger \tilde{H}_k + \sigma^2 I_{N_t})^{-1}] \quad (8)$$

Thus, the noise covariance is a function of $H_k^\dagger H_k$. Since $H_k^\dagger H_k$ is a symmetric normal matrix, it can be decomposed to Equation (9) as follows:

$$E[\tilde{n}_k \tilde{n}_k^\dagger] = \sigma^2 E[Q_k(D_k+\sigma^2 I_{N_t})^{-\dagger} D_k(D_k+\sigma^2 I_{N_t})^{-1} Q_k^\dagger] = \sigma^2 E[Q_k \tilde{D}_k Q_k^\dagger] \quad (9)$$

where Equation (10) is as follows:

$$\tilde{D}_k = \left[ \begin{pmatrix} \frac{d_i}{(d_i+\sigma^2)^2} & \cdots & 0 \\ \vdots & \ddots & \vdots \\ 0 & \cdots & \frac{d_p}{(d_p+\sigma^2)^2} \end{pmatrix} \right] \quad (10)$$

The expected eigenvalue of $H_k^\dagger H_k$ is already tabulated. In particular, when p=2, the following is derived in Equation (11) as follows:

$$E[d_1] = \bar{d}_1 = \frac{7P}{2N_t} \text{ and } E[d_2] = \bar{d}_2 = \frac{P}{2N_t} \quad (11)$$

such that noise covariance for Rayleigh fading channel matrices can be expressed as Equation (12) as follows:

$$E[\tilde{n}_k \tilde{n}_k^\dagger] = \hat{\sigma}^2 I_{N_r} \quad (12)$$

where Equation (13) is as follows:

$$\hat{\sigma}^2 = \frac{\sigma^2}{p} \sum_{i=1}^p \frac{\bar{d}_i}{(\bar{d}_i+\sigma^2)^2} \quad (13)$$

If a channel matrix does not follow Rayleigh fading distribution, and is not independently and identically distributed (i.i.d.), then Equation (11) above is not true, and Equation (12) is not guaranteed to precisely hold. Alternatively, it is possible to measure $H_k^\dagger H_k$ directly and calculate Equation (11). In addition, Equation (12) could approximately hold unless the channel environment is in an extreme case.

Then, the distribution of the received signal in Equation (7) above may be derived to follow a zero-mean Gaussian distribution with the covariance as in Equation (14) as follows:

$$\sum = W_k W_k^\dagger + \hat{\sigma}^2 I_{N_r} = \begin{cases} w_k w_k^\dagger + \hat{\sigma}^2 I_2 & \text{if rank 1} \\ I_2 + \hat{\sigma}^2 I_2 & \text{if rank 2} \end{cases} \quad (14)$$

The summation function block 509 is connected to the re-calculation function block 507 for calculating, using the statistical result above, a sample sum of serving-cancelled received signals $\hat{y}\hat{y}^\dagger$ as in Equation (15) as follows:

$$S_n = \Sigma_{k=1}^n \hat{y}_k \hat{y}_k^\dagger \quad (15)$$

The eigenvalue generator 511 is connected to the summation function block 509 for generating eigenvalues for each possible rank (e.g., two eigenvalues) of $S_n$.

A probability density function generator 513 is connected to the eigenvalue generator 511 for generating the joint PDF for each possible rank. For example, if two eigenvalues for two possible ranks are $l_1$ and $l_2$, and if $W_k$ is a rank 1 matrix, then the joint PDF of the two eigenvalues $l_1$ and $l_2$ are as in Equation (16) as follows:

$$f_1(l_1, l_2 | q=1) = \frac{n}{2\pi\hat{\sigma}^2(1+\hat{\sigma}^2)} \exp\left(-\frac{n}{2} \left( \frac{\left(l_1 - \hat{\sigma}^2 + \frac{\hat{\sigma}^2(1+\hat{\sigma}^2)}{n}\right)^2}{\hat{\sigma}^4} + \frac{\left(l_2 - \hat{\sigma}^2 - 1 - \frac{\hat{\sigma}^2(1+\hat{\sigma}^2)}{n}\right)^2}{(1+\hat{\sigma}^2)^2} \right) \right) \quad (16)$$

If $W_k$ is a rank 2 matrix, then the joint PDF of the two eigenvalues $l_1$ and $l_2$ are as in Equation (17) as follows:

$$f_1(l_1, l_2 | q=2) = \frac{n\sqrt{n}(l_2-l_1)}{2\sqrt{\pi}\lambda^3} \exp\left(-\frac{n}{2} \frac{(l_2-\lambda)^2 + (l_1-\lambda)^2}{\lambda^2}\right) \quad (17)$$

where $$\lambda = \frac{1}{2} + \hat{\sigma}^2.$$

$$\frac{f_1(l_1, l_2 | q=1)}{f_1(l_1, l_2 | q=2)} \underset{>}{\overset{<}{}} 1 \quad (18)$$

The decision rule of interference rank is simplified to Equation (18) as follows:

For greater estimation accuracy, the signal gain may be post-compensated. Although it is assumed that $W_{mmse,k}^\dagger H_k$ in Equation (7) above is an identity matrix, it is not an identity matrix in general. So, as was done in the compensation of the noise vector, the following could be captured as in Equation (19) as follows:

$$W_{mmse,k}^\dagger \tilde{H}_k W_k = (\tilde{H}_k^\dagger \tilde{H}_k + \sigma^2 I_{N_t})^{-1} \tilde{H}_k^\dagger \tilde{H}_k W_k = Q_k(D_k + \sigma^2 I_{N_t})^{-\dagger} D_k Q_k^\dagger W_k = Q_k \hat{D}_k Q_k^\dagger W_k \quad (19)$$

where Equation (20) is as follows:

$$\hat{D}_k = \left[ \begin{pmatrix} \frac{d_i}{(d_i+\sigma^2)^2} & \cdots & 0 \\ \vdots & \ddots & \vdots \\ 0 & \cdots & \frac{d_p}{(d_p+\sigma^2)^2} \end{pmatrix} \right] \quad (20)$$

The constant β may be defined as in Equation (21) as follows:

$$\beta = \frac{1}{p} \sum_{i=1}^p \frac{d_i}{d_i+\sigma^2} \quad (21)$$

where this can be applied to the joint PDF in Equations (16) and (17) above. In detail, the joint PDF, given rank 1, is updated as in Equation (22) as follows:

$$f_1(l_1, l_2 \mid q = 1) = \qquad (22)$$

$$\frac{n}{2\pi\hat{\sigma}^2(\beta^2 + \hat{\sigma}^2)} \exp\left(-\frac{n}{2}\left(\frac{\left(l_1 - \hat{\sigma}^2 + \frac{\hat{\sigma}^2(\beta^2 + \hat{\sigma}^2)}{n}\right)^2}{\hat{\sigma}^4} + \frac{\left(l_2 - \hat{\sigma}^2 - \beta^2 - \frac{\hat{\sigma}^2(\beta^2 + \hat{\sigma}^2)}{n}\right)^2}{(\beta^2 + \hat{\sigma}^2)^2}\right)\right)$$

and the other joint PDF, given rank 2, is updated as in Equation (23) as follows:

$$f_1(l_1, l_2 \mid q = 2) = \frac{n\sqrt{n}(l_2 - l_1)}{2\sqrt{n}\tilde{\lambda}^3} \exp\left(-\frac{n}{2}\frac{(l_2 - \tilde{\lambda})^2 + (l_1 - \tilde{\lambda})^2}{\tilde{\lambda}^2}\right) \qquad (23)$$

where $$\tilde{\lambda} = \frac{\beta^2}{2} + \hat{\sigma}^2.$$

The decision rule in Equation (18) above may be used with the updated PDFs.

The comparator 515 is connected to the probability density function generator 513 for comparing the probabilities from the two PDFs, and determining the rank of the more reliable hypothesis (e.g., the hypothesis with the highest probability) as the rank of the interference. This is referred to as a hard rank. In an embodiment of the present disclosure described below, a soft rank is described. While the description above concerns rank 1 and 2, the present disclosure is not limited thereto. Thus, for a number of ranks greater than 2, the method above applies so that the rank associated with the most reliable hypothesis is determined to be the rank of the associated interference.

Figure 6:
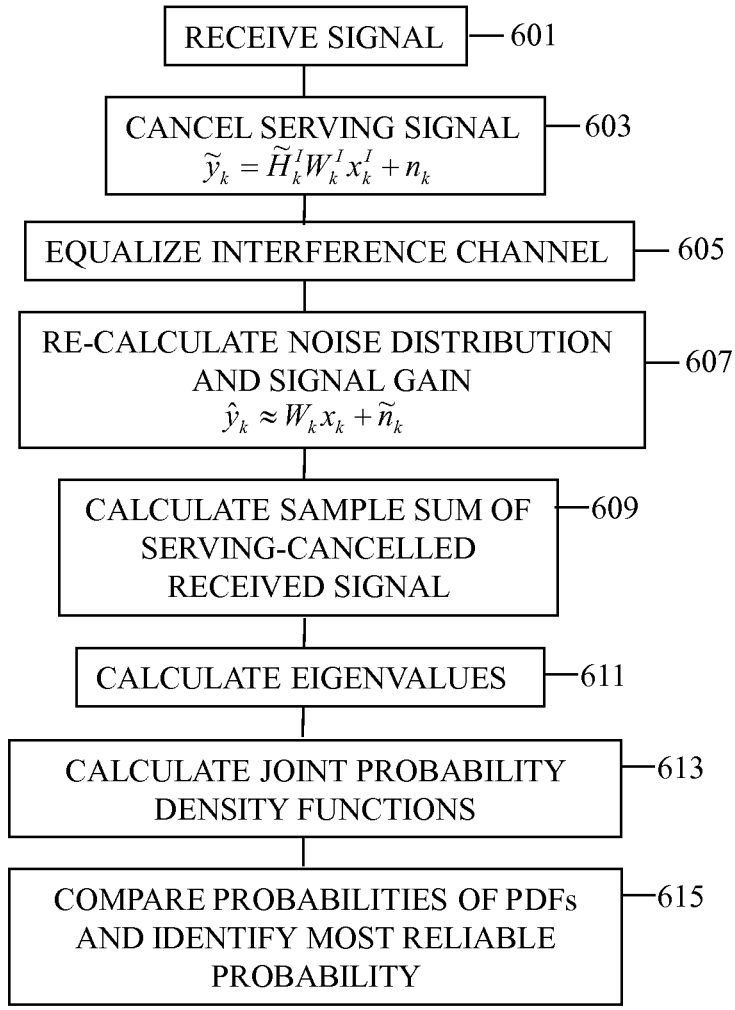
FIG. 6 is a flowchart of a method of blind detection of interference rank information using a hard rank according to an embodiment of the present disclosure.

FIG. 6 is a flowchart of a method of blind detection of interference rank information according to an embodiment of the present disclosure.

Referring to FIG. 6, a signal (e.g., an LTE signal) is received at 601.

At 603, a serving signal $x_k^s$ is cancelled from the signal received at 601, where the received signal may be expressed by Equation (4) above.

At 605, the interference signal is equalized. In an embodiment of the present disclosure, the effect of a channel matrix, $H_k$, can be equalized with linear detection, MMSE, as in Equation (6) above.

At 607, the noise distribution and signal gain of the received signal is re-calculated (e.g., approximated) as in Equation (7) above.

The noise vector is changed from white noise to MMSE-filtered noise.

If a channel matrix follows Rayleigh fading distribution, the statistical characteristics of MMSE-filtered noise could be analytically derived. The detail development is given above in Equations (8) to (13).

Thus, the noise covariance is a function of $H_k^\dagger H_k$. Since $H_k^\dagger H_k$ is a symmetric normal matrix, it can be decomposed to Equation (9) above.

The expected eigenvalue of $H_k^\dagger H_k$ is already tabulated. In particular, when p=2, the following is derived in Equation (11) above, such that noise covariance for Rayleigh fading channel matrices can be expressed as Equation (12) above.

If a channel matrix does not follow Rayleigh fading distribution, and is not independently and identically distributed (i.i.d.), then Equation (11) above is not true, and Equation (12) above is not guaranteed to precisely hold. Alternatively, it is possible to measure $H_k^\dagger H_k$ directly and calculate Equation (11) above. In addition, Equation (12) above could approximately hold unless the channel environment is in an extreme case.

Then, the distribution of the received signal in Equation (7) above may be derived to follow a zero-mean Gaussian distribution with the covariance as in Equation (14) above.

At 609, using the statistical result above, a sample sum of serving-cancelled received signals $\hat{y}\hat{y}^\dagger$ may be calculated as in Equation (15) above.

At 611, eigenvalues for each possible rank (e.g., two eigenvalues) of $S_n$ may be calculated.

At 613, the joint PDF for each possible rank is calculated. For example, if two eigenvalues for two possible ranks are $l_1$ and $l_2$, and if $W_k$ is a rank 1 matrix, the joint PDF of the two eigenvalues $l_1$ and $l_2$ are as in Equation (16) above.

In contrast, if $W_k$ is a rank 2 matrix, the joint PDF of the two eigenvalues $l_1$ and $l_2$ are as in Equation (17) above. The decision rule of interference rank is simplified as in Equation (18) above.

For greater estimation accuracy, the signal gain may be post-compensated. Although it is assumed that $W_{mmse,k}^\dagger H_k$ in Equation (7) above is an identity matrix, it is not an identity matrix in general. So, as was done in the compensation of the noise vector, the following could be captured as in Equation (19) above.

The constant β may be defined as in Equation (21) above, where this can be applied to the joint PDF in Equations (16) and (17) above. In detail, the joint PDF given rank 1 is updated as in Equation (22) above, and the other joint PDF given rank 2 is update as in Equation (23) above. The decision rule in Equation (18) above may be used with these updated PDFs.

At 615, probabilities from the two PDFs are compared, and the rank of the more reliable hypothesis (e.g., the hypothesis with the highest probability) is determined as the rank of the interference. This is referred to as a hard rank. In an embodiment of the present disclosure described below, a soft rank is described. While the description above concerns rank 1 and 2, the present disclosure is not limited thereto. Thus, for a number of ranks greater than 2, the method above applies so that the rank associated with the most reliable hypothesis is determined to be the rank of the associated interference.

Figure 7:
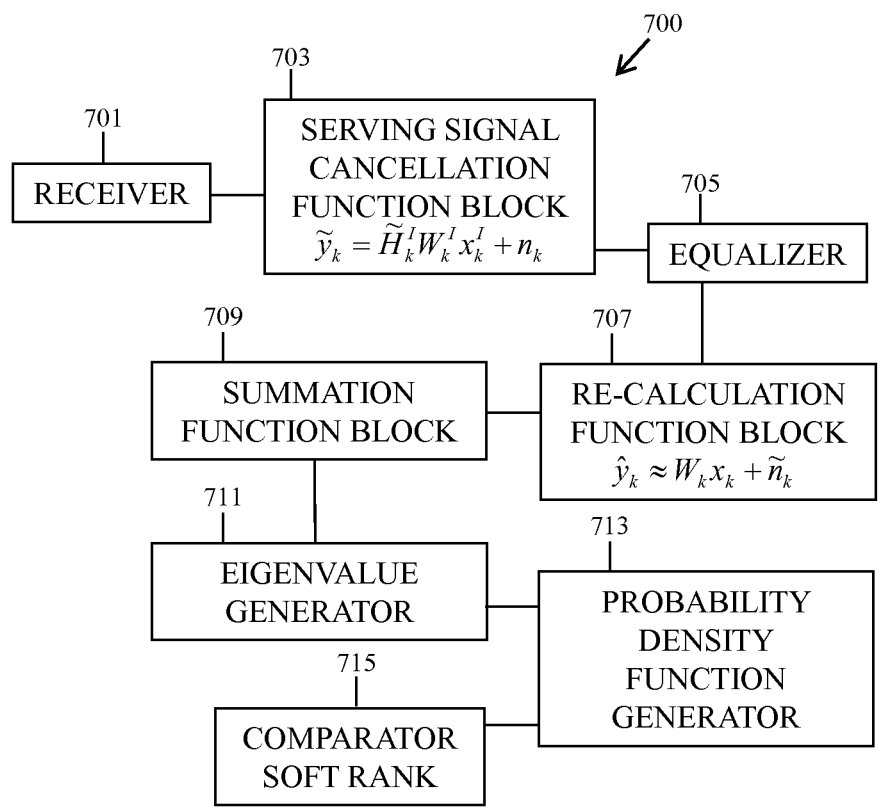
FIG. 7 is a block diagram of an apparatus for blind detection of interference rank information using a soft rank according to an embodiment of the present disclosure.

FIG. 7 is an apparatus 700 for blind detection of interference rank information according to an embodiment of the present disclosure.

Referring to FIG. 7, the apparatus 700 includes a receiver 701, a serving signal cancellation function block 703, an equalizer 705, a re-calculation function block 707, a summation function block 709, an eigenvalue generator 711, a probability density function generator 713, and a comparator 715.

The receiver 701 receives a signal (e.g., an LTE signal).

The serving signal cancellation function block 703 is connected to the receiver 701 for cancelling a serving signal $x_k^s$ from the signal received by the receiver 701, where the received signal may be expressed by Equation (4) above, where Equation (4) is a modification of Equation (1) above, and where the subscript k indicates an index of REs having the same source of interference. Moreover, a power allocation matrix $P_k$ is added for both serving and interfering signals, which is effectively combined into a channel matrix $\tilde{H}_k$.

It is assumed that the transmission mode (TM) is a cell-specific reference signal (CRS) related mode such as transmission mode 4 (TM4). However, the present disclosure is not limited to CRS, but could be applied to other TMs. In order to successfully cancel a serving signal, a UE should be aware of its own channel, power, precoding matrices, and its transmission data at the kth RE. The first three matrices $H_k^s$, $P_k^s$, and $W_k^s$, can be measured. Regarding the serving data $x_k^s$, two or more scenarios may be considered. That is, treating interference as noise and attempting to decode a serving signal. If a CRC is passed, no more processing is required. Otherwise, the decoding result is re-used to generate a soft mean of $x_k^s$, or its hard symbol from a slicer function block. If the number of CRS samples is sufficient, $x_k^s$, may be a CRS symbol itself, indicating that it is known by the UE.

The receive signal of Equation (4) above may then be represented by only the interference and its channel matrix $\tilde{H}_k^I$. Thus, the superscript I is omitted. From a current 3GPP LTE specification, an embodiment of the present disclosure considers a set of precoding matrices for the possible ranks (e.g., rank 1 or rank 2) in Equation (5) above.

The equalizer 705 is connected to the serving signal cancellation function block 703 for equalizing the interference signal. In an embodiment of the present disclosure, the effect of a channel matrix, $H_k$, can be equalized with linear detection, MMSE, as in Equation (6) above.

The re-calculation function block 707 is connected to the equalizer 705 for re-calculating (e.g., approximating) the noise distribution and signal gain of the received signal as in Equation (7) above.

The noise vector is changed from white noise to MMSE-filtered noise.

If a channel matrix follows Rayleigh fading distribution, the statistical characteristics of MMSE-filtered noise could be analytically derived. The detail development is given in Equations (8) to (13) above.

Thus, the noise covariance is a function of $H_k^\dagger H_k$. Since $H_k^\dagger H_k$ is a symmetric normal matrix, it can be decomposed to Equation (9) above.

The expected eigenvalue of $H_k^\dagger H_k$ is already tabulated. In particular, when p=2, the following is derived in Equation (11) above.

If a channel matrix does not follow Rayleigh fading distribution, and is not independently and identically distributed (i.i.d.), then Equation (11) above is not true, and Equation (12) above is not guaranteed to precisely hold. Alternatively, it is possible to measure $H_k^\dagger H_k$ directly and calculate Equation (11) above. In addition, Equation (12) above could approximately hold unless the channel environment is in an extreme case.

Then, the distribution of the received signal in Equation (7) above may be derived to follow a zero-mean Gaussian distribution with the covariance as in Equation (14) above.

A summation function block 709 is connected to the re-calculation function block 707 for calculating, using the statistical result above, a sample sum of serving-cancelled received signals $\hat{y}\hat{y}^\dagger$ as in Equation (15) above.

The eigenvalue generator 711 is connected to the summation function block 709 for generating eigenvalues for each possible rank (e.g., two eigenvalues) of $S_n$.

The probability density function generator 713 is connected to the eigenvalue generator 711 for generating the joint PDF for each possible rank. For example, if two eigenvalues for two possible ranks are $l_1$ and $l_2$, and if $W_k$ is a rank 1 matrix, the joint PDF of the two eigenvalues $l_1$ and $l_2$ are as in Equation (16) above.

If $W_k$ is a rank 2 matrix, the joint PDF of the two eigenvalues $l_1$ and $l_2$ are as in Equation (17) above. The decision rule of interference rank is simplified to Equation (18) above.

For greater estimation accuracy, the signal gain may be post-compensated. Although it is assumed that $W_{mmse,k}^\dagger H_k$ in Equation (7) above is an identity matrix, it is not an identity matrix in general. So, as was done in the compensation of the noise vector, the following could be captured as in Equation (19) above.

In an average sense, the constant $\beta$ may be defined as in Equation (21) above, where this can be applied to the joint PDF in Equations (16) and (17) above. In detail, the joint PDF given rank 1 is updated as in Equation (22) above, and the other joint PDF given rank 2 is updated as in Equation (23) above. The decision rule in Equation (18) above may be used with these updated PDFs.

A comparator 715 is connected to the probability density function generator 713 to determine ratios and relative probabilities between the probabilities of the PDFs generated by the probability density function generator 713. This is referred to as a soft rank. The probabilities of all of the ranks are retained for subsequent blind detection operations. In an embodiment of the present disclosure, a soft rank may be applied (e.g., a probability is determined for each possible rank). For example, if the probability of rank 1 is 70% and the probability of rank 2 is 30%, both ranks are considered with 70% and 30% probabilities, respectively. While the description above concerns rank 1 and 2, the present disclosure is not limited thereto. Thus, for a number of ranks greater than 2, the method above applies so that the rank associated with the most reliable hypothesis is determined to be the rank of the associated interference.

Figure 8:
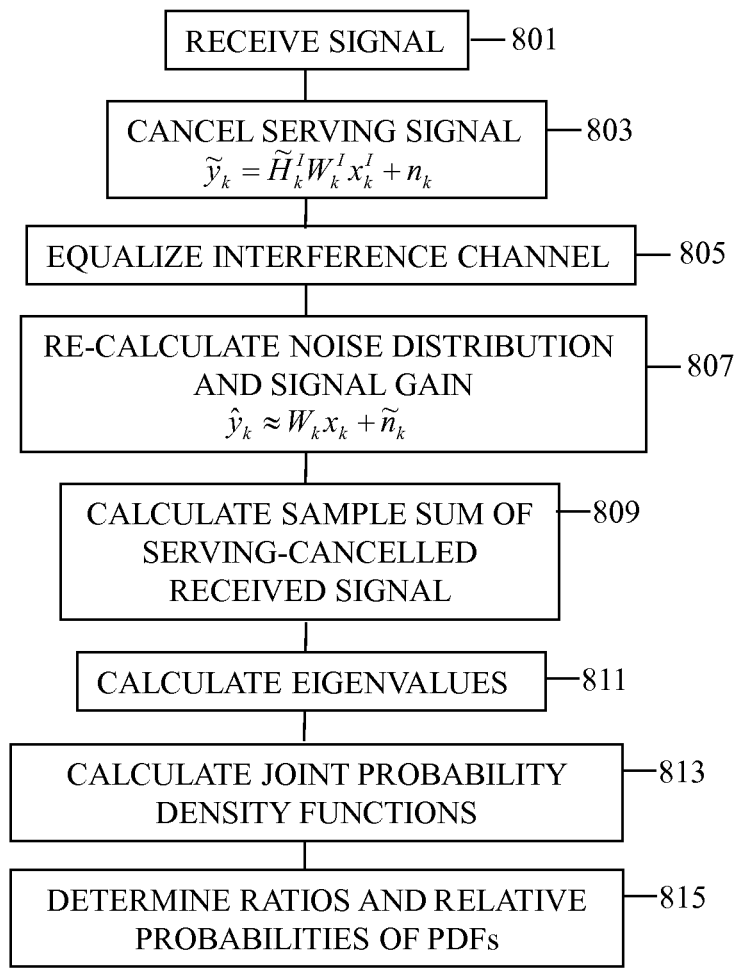
FIG. 8 is a flowchart of a method of blind detection of interference rank information using a soft rank according to an embodiment of the present disclosure.

FIG. 8 is a flowchart of a method of blind detection of interference rank information according to an embodiment of the present disclosure.

Referring to FIG. 8, a signal (e.g., an LTE signal) is received at 801.

At 803, a serving signal $x_k^s$, is cancelled from the signal received at 801, where the received signal may be expressed by Equation (4) above.

It is assumed that the transmission mode (TM) is a cell-specific reference signal (CRS) related mode such as transmission mode 4 (TM4). However, the present disclosure is not limited to CRS, but could be applied to other TMs. In order to successfully cancel a serving signal, a UE should be aware of its own channel, power, precoding matrices, and its transmission data at the kth RE. The first three matrices $H_k^s$, $P_k^s$, and $W_k^s$, can be measured. Regarding the serving data $x_k^s$, two or more scenarios may be considered. That is, treating interference as noise and attempting to decode a serving signal. If a CRC is passed, no more processing is required. Otherwise, the decoding result is re-used to generate a soft mean of $x_k^s$, or its hard symbol from a slicer function block. If the number of CRS samples is sufficient, $x_k^s$, may be a CRS symbol itself, indicating that it is known by the UE.

The receive signal of Equation (4) may then be represented by only the interference and its channel matrix $\tilde{H}_k^I$. Thus, the superscript, I, is omitted below. From a current 3GPP LTE specification, an embodiment of the present disclosure considers a set of precoding matrices for the possible ranks (e.g., rank 1 or rank 2) in Equation (5) above.

At 805, the interference signal is equalized. In an embodiment of the present disclosure, the effect of a channel matrix, $H_k$, can be equalized with linear detection, MMSE, as in Equation (6) above.

At 807, the noise distribution and signal gain of the received signal is re-calculated (e.g., approximated) as in Equation (7) above.

The noise vector is changed from white noise to MMSE-filtered noise.

If a channel matrix follows Rayleigh fading distribution, the statistical characteristics of MMSE-filtered noise could be analytically derived. The detail development is given in Equations (8) to (13) above.

Thus, the noise covariance is a function of $H_k^\dagger H_k$. Since $H_k^\dagger H_k$ is a symmetric normal matrix, it can be decomposed to Equation (9) above.

The expected eigenvalue of $H_k^\dagger H_k$ is already tabulated. In particular, when p=2, the following is derived in Equation (11) above, such that noise covariance for Rayleigh fading channel matrices can be expressed as Equation (12) above.

If a channel matrix does not follow Rayleigh fading distribution, and is not independently and identically distributed (i.i.d.), then Equation (11) above is not true, and Equation (12) above is not guaranteed to precisely hold. Alternatively, it is possible to measure $H_k^\dagger H_k$ directly and calculate Equation (11) above. In addition, Equation (12) above could approximately hold unless the channel environment is in an extreme case.

Then, the distribution of the received signal in Equation (7) above may be derived to follow a zero-mean Gaussian distribution with the covariance as in Equation (14) above.

At 809, using the statistical result above, a sample sum of serving-cancelled received signals $\hat{y}\hat{y}^\dagger$ may be calculated as in Equation (15) above.

At 811, eigenvalues for each possible rank (e.g., two eigenvalues) of $S_n$ may be calculated.

At 813, the joint PDF for each possible rank is calculated. For example, if two eigenvalues for two possible ranks are $l_1$ and $l_2$, and if $W_k$ is a rank 1 matrix, the joint PDF of the two eigenvalues $l_1$ and $l_2$ are as in Equation (16) above.

In contrast, if $W_k$ is a rank 2 matrix, the joint PDF of the two eigenvalues $l_1$ and $l_2$ are as in Equation (17) above. The decision rule of interference rank is simplified as in Equation (18) above.

For greater estimation accuracy, the signal gain may be post-compensated. Although it is assumed that $W_{mmse,k}^\dagger H_k$ in Equation (7) above is an identity matrix, it is not an identity matrix in general. So, as was done in the compensation of the noise vector, the following could be captured as in Equation (19) above.

In an average sense, the constant β may be defined as in Equation (21) above, where this can be applied to the joint PDF in Equations (16) and (17) above. In detail, the joint PDF given rank 1 is updated as in Equation (22) above, and the other joint PDF given rank 2 is update as in Equation (23) above. The decision rule in Equation (18) above may be used with these updated PDFs.

At 815, ratios and relative probabilities between the probabilities of the PDFs are determined. This is referred to as a soft rank. The probabilities of all of the ranks are retained for subsequent blind detection operations. In an embodiment of the present disclosure, a soft rank may be applied (e.g., a probability is determined for each possible rank). For example, if the probability of rank 1 is 70% and the probability of rank 2 is 30%, both ranks are considered with 70% and 30% probabilities, respectively. While the description above concerns rank 1 and 2, the present disclosure is not limited thereto. Thus, for a number of ranks greater than 2, the method above applies so that the rank associated with the most reliable hypothesis is determined to be the rank of the associated interference.

Figure 9:
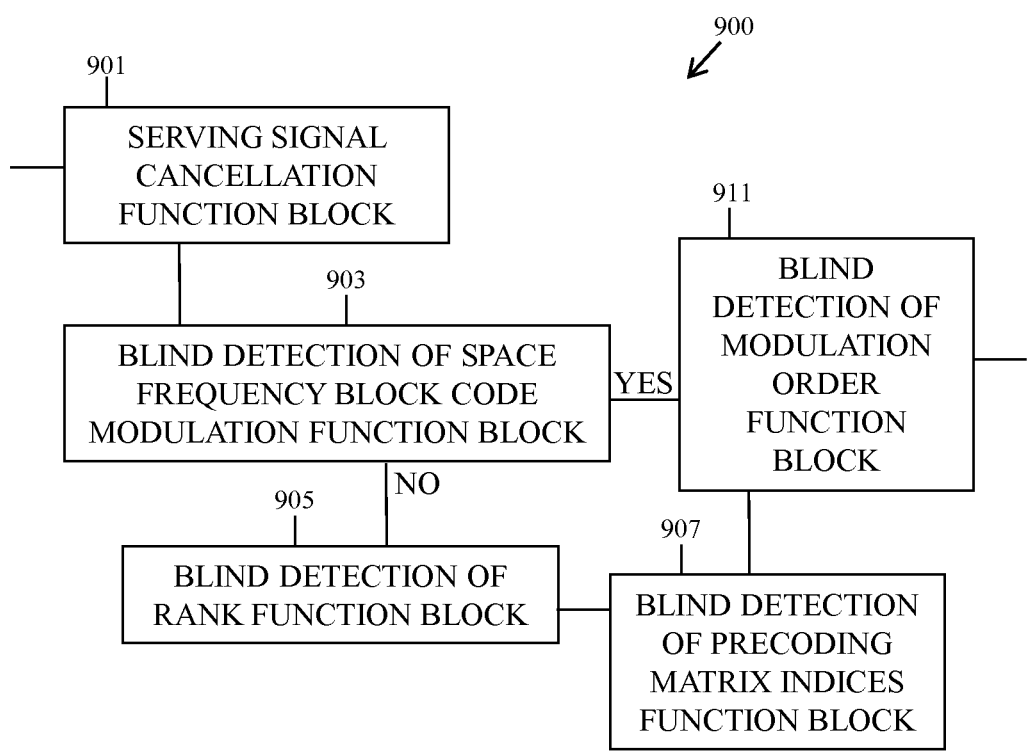
FIG. 9 is a block diagram of an apparatus for blind detection of modulation order using blind detection of interference rank information and blind detection of precoding matrix indices according to an embodiment of the present disclosure.

FIG. 9 is a block diagram of an apparatus 900 for blind detection of precoding matrix indices and blind detection of modulation order using blind detection of interference rank information according to an embodiment of the present disclosure.

Referring to FIG. 9, the apparatus 900 includes a serving signal cancellation function block 901, a blind detection of space frequency block code (SFBC) modulation function block 903, a blind detection of rank function block 905, a blind detection of precoding matrix indices function block 907, and a blind detection of modulation order function block 911.

The serving signal cancellation function block 901 receives a signal, cancels a serving signal $x_s$ from the received signal, and outputs the result.

The blind detection of SFBC modulation function block 903 is connected to the serving signal cancellation function block 901 and receives the output of the serving signal cancellation function block 901. The blind detection of SFBC modulation function block 903 determines whether the output of the serving signal cancellation function block 901 is SFBC modulated or not.

If output of the serving signal cancellation function block 901 is not SFBC modulated, the output of the serving signal cancellation function block 901 is transmitted to the blind detection of rank function block 905. Otherwise, the output of the serving signal cancellation function block 901 is transmitted to the blind detection of modulation order function block 911.

If the blind detection of rank function block 905 receives the output of the serving signal cancellation function block 901 from the blind detection of SFBC modulation function block 903, the blind detection of rank function block 905 may determine the rank of the output using one of the apparatuses and/or methods described above. Then, the blind detection of rank function block 905 transmits the output of the serving signal cancellation function block 901 and the determination of rank to the blind detection of precoding matrix indices function block 907.

The blind detection of precoding matrix indices function block 907 uses the output of the serving signal cancellation function block 901 and the determination of rank to determine precoding matrix indices of the output of the serving signal cancellation function block 901. Then, the blind detection of precoding matrix indices function block 907 transmits the output of the serving signal cancellation function block 901 and the determination of precoding matrix indices of the output of the serving signal cancellation function block 901 to the blind detection of modulation order function block 911.

Figure 10:
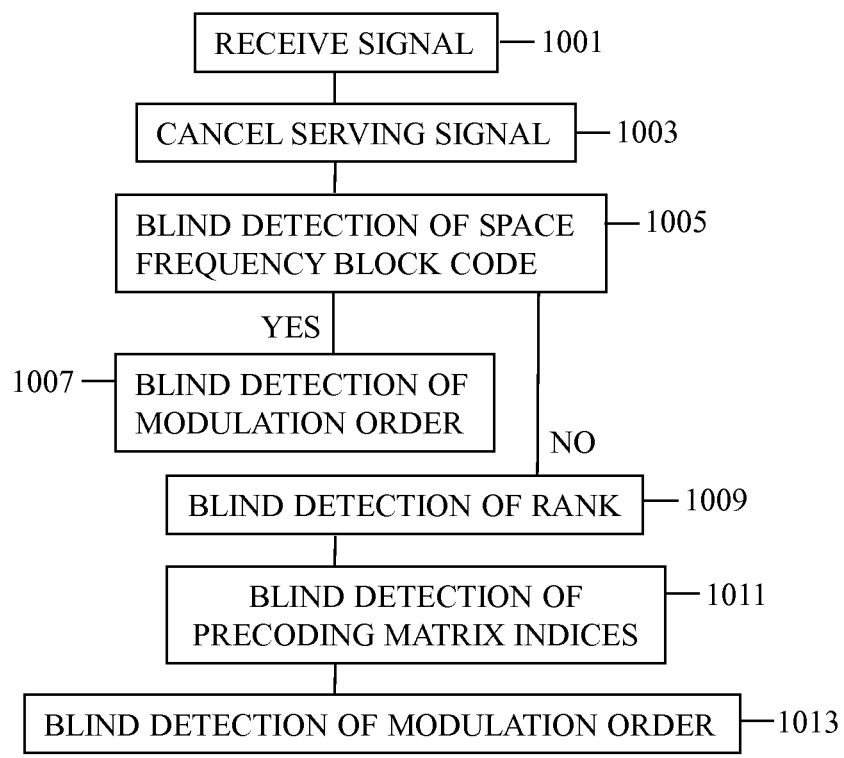
FIG. 10 is a flowchart of a method of blind detection of modulation order using blind detection of interference rank information and blind detection of precoding matrix indices according to an embodiment of the present disclosure.

FIG. 10 is a flowchart of a method of blind detection of precoding matrix indices and blind detection of modulation order using blind detection of interference rank information according to an embodiment of the present disclosure.

Referring to FIG. 10, a signal is received at 1001.

At 1003, a serving signal $x_s$ is cancelled from the received signal.

At 1005, it is determined whether or not the signal resulting from 1003 is SFBC modulated.

If the result of 1005 is SFBC modulated then the method proceeds to 1007. Otherwise, the method proceeds to 1009.

At 1007, a blind detection of modulation order is determined from the result of cancelling the serving signal $x_s$ from the received signal, and the method terminates.

At 1009, a blind detection of rank is determined from the result of cancelling the serving signal $x_s$ from the received signal, and the method proceeds to 1011. The blind determination of rank may use one of the apparatuses and/or methods described above.

At 1011, a blind detection of precoding matrix indices is determined using the result of 1007, and proceeding to 1013.

At 1013, a blind detection of modulation order is determined from the result of cancelling the serving signal $x_s$ from the received signal and the result of 1011.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
   receiving, by a receiver, a signal, wherein the signal includes a serving signal and an interference signal;
   removing, by a signal cancellation module, the serving signal from the received signal to provide a residual signal;
   equalizing, by an equalizer, the residual signal based on linear estimation;
   determining, by a summation module, a sample sum of the equalized signal;
   determining, by an eigenvalue generator, a plurality of eigenvalues from the sample sum; and
   estimating, by a transmission rank estimation module, a transmission rank of the interference signal using hypothesis testing based on the plurality of eigenvalues.

2. The method of claim 1, wherein estimating the transmission rank of the interference signal using hypothesis testing based on the plurality of eigenvalues is comprised of estimating one of a hard rank and a soft rank based on user equipment (UE) complexity, blind detection accuracy.

3. The method of claim 2, wherein estimating the hard rank comprises:
   calculating a probability density function (PDF) for each possible rank;
   selecting the PDF that is most reliable; and
   determining the transmission rank of the interference signal that corresponds to the most reliable PDF.

4. The method of claim 2, wherein estimating the soft rank comprises:
   calculating a ratio and relative probability density function (PDF) for each possible rank; and using the PDFs for each possible rank for blind detection of the transmission rank of the interference signal.

5. The method of claim 1, further comprising adjusting a signal gain and a noise vector of the equalized residual signal to compensate the equalized residual signal.

6. The method of claim 1, wherein removing the serving signal is comprised of removing the serving signal from the received signal so that the removed signal is represented by $\tilde{y}=H_I W_I x_I + n$, where $H_I$ a channel matrix of an interference signal, where $W_I$ is a precoding matrix of the interference signal, $x_I$ is the interference signal, and where n is a noise vector.

7. The method of claim 1, wherein removing the serving signal is comprised of removing the serving signal from the received signal so that the removed signal is represented by $\tilde{y}_k = \tilde{H}_k^I W_k^I x_k^I + n_k$, where $\tilde{H}_k^I$ is a channel matrix of an interference signal, where $W_k^I$ is a precoding matrix of the interference signal, $x_k^I$ is the interference signal, where $n_k$ is a noise vector, and where k indicates an index of resource elements having a common source of interference.

8. The method of claim 3, wherein determining the transmission rank that corresponds to the most reliable PDF is comprised of comparing the PDFs.

9. An apparatus, comprising:
   a receiver configured to receive a signal, wherein the signal includes a serving signal and an interference signal;
   a serving signal cancellation module configured to remove the serving signal from the received signal to provide a residual signal;
   an equalizer configured to equalize the residual signal based on linear estimation;
   a summation module configured to determine a sample sum of the equalized signal;
   an eigenvalue generator configured to determine a plurality of eigenvalues from the sample sum; and
   a transmission rank estimation module configured to estimate a transmission rank of the interference signal using hypothesis testing based on the plurality of eigenvalues.

10. The apparatus of claim 9, wherein the transmission rank estimation module is further configured to estimate one of a hard rank and a soft rank based on user equipment (UE) complexity, blind detection accuracy.

11. The apparatus of claim 10, wherein the transmission rank estimation module is further configured to estimate the hard rank by:
    calculating a probability density function (PDF) for each possible rank;
    selecting the PDF that is most reliable; and
    determining the transmission rank of the interference signal that corresponds to the most reliable PDF.

12. The apparatus of claim 10, wherein the transmission rank estimation module is further configured to estimate the soft rank by:
    calculating a ratio and relative probability density function (PDF) for each possible rank;
    and using the PDFs for each possible rank for blind detection of the transmission rank of the interference signal.

13. The apparatus of claim 9, further comprising:
    the serving signal cancellation module connected to the receiver;
    a blind detection of Space Frequency Block Code (SFBC) modulation module connected to the serving signal cancellation module and the apparatus;
    a blind detection of precoding matrix indices module connected to the apparatus; and
    a blind detection of modulation order module connected to the blind detection of SFBC modulation module and the blind detection of precoding matrix indices module.

14. The apparatus of claim 9, wherein the serving signal cancellation module is configured to remove the serving signal from the received signal so that the removed signal is represented by $\tilde{y}=H_I W_I x_I + n$, where $H_I$ is a channel matrix of an interference signal, where $W_I$ is a precoding matrix of the interference signal, $x_I$ is the interference signal, and where n is a noise vector.

15. The apparatus of claim 9, wherein the serving signal cancellation module is configured to remove the serving signal from the received signal so that the removed signal is represented by $\tilde{y}_k = \tilde{H}_k^I W_k^I x_k^I + n_k$, where $\tilde{H}_k^I$ is a channel matrix of an interference signal, where $W_k^I$ is a precoding matrix of the interference signal, $x_k^I$ is the interference signal, where $n_k$ is a noise vector, and where k indicates an index of resource elements having a common source of interference.

16. The apparatus of claim 10, wherein a blind detection of precoding matrix indices module is configured to determine a hard rank or a soft rank.

17. A chipset, configured to:

receive, by a receiver, a signal;

cancel, by a serving signal cancellation module, a serving signal from the received signal;

equalize, by an equalizer, an interference signal;

re-calculate, by a re-calculation module, a noise distribution and a signal gain;

calculate, by a summation module, a sample sum of the result of re-calculating the noise distribution and the signal gain;

generate, by an eigenvalue generator, an eigenvalue for each possible rank;

generate, by a probability density function generator, a probability density function for each possible rank; and compare, by a comparator, probabilities from the probability density functions to blindly detect interference rank information.

18. The chipset of claim 17, further configured to:

determine, by a blind detection of Space Frequency Block Code (SFBC) modulation module, whether the result of cancelling the serving signal from the received signal is SFBC modulated; and if the result of cancelling the serving signal from the received signal is SFBC modulated then perform a blind detection of modulation order of the result of cancelling the serving signal from the received signal, otherwise:

determine a blind detection of precoding matrix indices from the result of a blind detection of rank; and perform a blind detection of modulation order of the result of cancelling the serving signal from the received signal, the blind detection of rank, and the blind detection of precoding matrix indices.

19. The method of claim 17, wherein the chipset is further configured to cancel, by the serving signal cancellation module, the serving signal from the received signal so that the cancelled signal is represented by $\tilde{y} = H_I W_I x_I + n$, where $H_I$ is a channel matrix of an interference signal, where $W_I$ is a precoding matrix of the interference signal, $x_I$ is the interference signal, and where n is a noise vector.

20. The method of claim 17, wherein the chipset is further configured to cancel, by the serving signal cancellation module, the serving signal from the received signal so that the cancelled signal is represented by $\tilde{y}_k = \tilde{H}_k^I W_k^I x_k^I + n_k$, where $\tilde{H}_k^I$ is a channel matrix of an interference signal, where $W_k^I$ is a precoding matrix of the interference signal, $x_k^I$ is the interference signal, where $n_k$ is a noise vector, and where k indicates an index of resource elements having a common source of interference.

* * * * *